Oct. 24, 1967     G. T. R. CAMPBELL ET AL     3,348,515

DESIGN OF GENERAL CARGO AND BULK CARGO VESSEL

Filed Sept. 20, 1966     3 Sheets-Sheet 1

INVENTORS
G.T.R. CAMPBELL
N.V. LASKEY

Fetherstonhaugh & Co.
ATTORNEYS

Oct. 24, 1967  G. T. R. CAMPBELL ET AL  3,348,515
DESIGN OF GENERAL CARGO AND BULK CARGO VESSEL
Filed Sept. 20, 1966  3 Sheets-Sheet 2
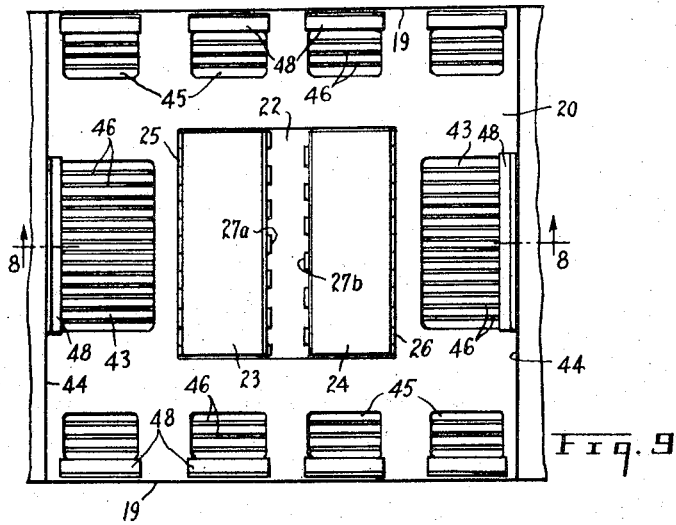
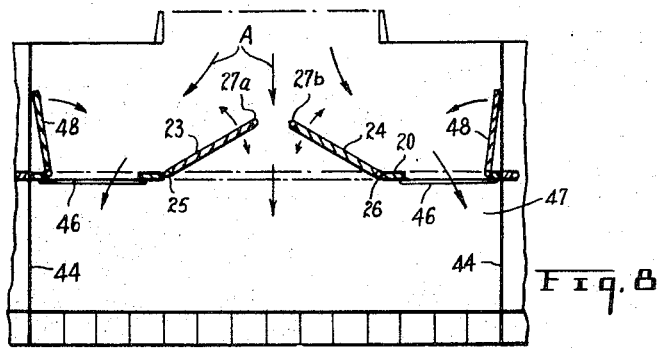
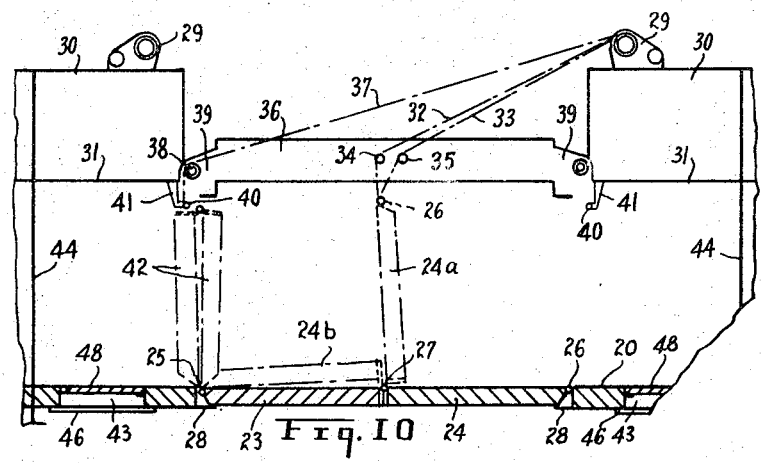
INVENTORS
G.T.R. CAMPBELL
N.V. LASKEY
ATTORNEYS Oct. 24, 1967   G. T. R. CAMPBELL ET AL   3,348,515
DESIGN OF GENERAL CARGO AND BULK CARGO VESSEL
Filed Sept. 20, 1966   3 Sheets-Sheet 3

INVENTORS
G. T. R. CAMPBELL
N. V. LASKEY

Fetherstonhaugh & Co.
ATTORNEYS

United States Patent Office 3,348,515
Patented Oct. 24, 1967

3,348,515
DESIGN OF GENERAL CARGO AND
BULK CARGO VESSEL
George T. R. Campbell, Montreal, Quebec, and Norman V. Laskey, St. Lambert, Quebec, Canada, assignors to Algonquin Shipping and Trading Limited, Montreal, Quebec, Canada
Filed Sept. 20, 1966, Ser. No. 580,736
Claims priority, application Canada, Sept. 2, 1966, 969,482
7 Claims. (Cl. 114—72)

This invention relates to the design of general cargo and bulk cargo vessels and particularly to combine in one vessel all the advantages of an "open" ship, a "closed" shelter deck vessel and a single deck dry bulk carrying vessel.

In "open" ships presently in use, it is usual to provide three cargo-holds oriented transversely across the vessel. The area of the tween deck is almost completely eliminated, but there is virtually no transverse overhang of the main deck and thus cargo can be loaded and discharged rapidly, as the hook of the cargo crane can be arranged to plumb the load at all times. The disadvantage of this arrangement is the high cost of providing three cargo-hatches on the main deck and six below the main deck, all of which have to be served by folding or hinging types of hatch covers. In addition, the stowage of cargo has to be arranged with a vertical mode of segregation as the only useful space for stowage below the main deck, excluding the inner bottom, is on the hatch covers. It is for this reason that difficulties are experienced in service, when the vessel has to load and unload cargo at a number of ports along a given route. This is because it is not always possible to stow cargo in the correct sequence to avoid having to unload and reload cargo from the stowage levels below the main deck in order to unload a particular parcel stowed on the inner bottom for a consignee who requires his cargo at an intermediate port along a given trade route. In this type of vessel the only useful space available at the two levels below the main deck in the fore and aft direction, is on the hatch covers. Where three hatches are oriented across the vessel, it is necessary to install longitudinal bulkheads in order to provide a standard of strength sufficient to resist longitudinal wave bending stresses in the hull girder, as so much of the main deck is removed to accommodate the hatches. When these longitudinal bulkheads are provided, an "open" ship is suitable for the carriage of grain in bulk. In this type of ship where two hatches are provided instead of three, special wooden feeders have to be construed to form bulkheads around the perimeter of the hatches below the main deck, as longitudinal bulkheads are not necessary for strength reasons. These wooden bulkheads have to be extended vertically between the level of the lower hatches and the main deck to form a feeder. This is a time consuming task and a costly one, but is a requirement tabled by the International Conference on Safety of Life at Sea 1960. The "open" ship type is totally unsuited for the carriage of coal, or any other types of bulk cargoes transported in ships, as the width of the hatches is not sufficient for easy access of large grabs.

In vessels known as closed shelter deck vessels, in order to provide a large tween deck area to permit cargo to be segregated in a horizontal mode, the width of the hatches at the level of the main deck and the tween decks is, on average, about one third the breadth of the vessel. This arrangement has been found very satisfactory when the vessel is traded to a number of ports and is loaded with general and break-bulk cargo. This arrangement provides adequate area for stowing and shifting cargo at the level of the tween decks, and the hatches at the levels of the main and tween decks are used primarily as a means of access to the tween decks and lower holds.

With regard to the stowage of grain in bulk in closed shelter-deck vessels, special wooden bulkheads have to be constructed around the perimeter of the hatches at the level of the tween decks and have to be extended vertically between the level of the main and tween decks to form a feeder. This type of vessel is totally unsuited for the carriage of coal or any other type of bulk cargo loaded in ships for, whereas the width of the hatches is barely sufficient for access of large grabs, the height of the tween decks precludes the removal of cargo from them by the grab and it also does not permit the use of a bulldozer for "cleaning-up" at the end of a discharge.

Single-deck bulk carriers are provided with upper wing ballast tanks and the inner bottom is hoppered at the sides. The angle at which the base of the upper wing ballast tanks is set, in relation to a horizontal line drawn through the point of intersection of the base of this tank with the side shell, has to be 30° and the width of the hatch is not to exceed 50% of the breadth of the vessel, so that bulk grain cargoes can be loaded without the need to erect grain shifting boards vide the International Conference on Safety of Life at Sea 1960. The hoppers provided for the inner bottom at the sides of the vessel are designed to facilitate unloading of bulk cargoes as they help to reduce transverse overhang of the main deck. This type of vessel is suitable for transporting all grades of dry bulk cargoes. In this type of vessel the longitudinal overhang of the main deck is reduced to a minimum and the base of the transverse bulkheads are also hoppered in order to expedite the unloading of bulk cargoes. As no tween decks are fitted, bulk cargoes can be unloaded by grabs very rapidly and, during a loading operation, no manual trimming is necessary.

In order to overcome the objections discussed above in connection with three types of vessels presently in use and at the same time produce a vessel which is capable of carrying a full load of bulk cargo such as grain or other heavy bulk cargo such as coal, phosphate rock, potash, bauxite and iron ore, the following described vessel embodies upper wing ballast tanks in association with a main deck hatch width which is equivalent to 50% of the breadth of the vessel. The vessel also includes a self-supporting tween deck which is provided with a hatch which has a width similar to the hatch located on the main deck. The inner bottom is stiffened for the carriage of heavy cargoes and no hoppers are provided at the sides of the inner bottom. When a grain cargo is loaded, it is not necessary to erect grain shifting boards. The upper wing ballast tanks provide self-trimming features for the tween deck while large feeder hatches are located at regular intervals along the tween deck on port and starboard sides of the vessel, as well as in way of the longitudinal overhang of the tween deck adjacent to the transverse bulkheads, provide self-trimming features for the lower hold when dry cargoes such as grain, coal, phosphate rock, potash, bauxite and iron ore cargoes are loaded.

Beam knees and brackets are completely eliminated in the vessel covered by the present application, thereby facilitating the stowage of generally and container cargo. In addition, a height of 8'6" has been selected as the vertical distance between the tween deck and main deck at the extreme breadth of the vessel, so as to permit a maximum number of containers which have a standard cross-section (8'0" x 8'0") to be stowed on the tween deck. Further, in way of the tween deck hatch, two tiers of containers can be stowed as can trailer trucks and other large wheeled or tracked commercial vehicles. Two layers of container of standard cross-section can also be stowed on the tank top in way of the lower hold.

The tween deck hatch covers play an important role in a vessel designated to this precept. The hatch covers have their top surfaces flush with the top surface of the tween deck and are arranged for hinging, folding and stowing. When bulk grain cargoes are loaded the tween deck hatch covers are arranged at an angle of 30° to the horizontal to form a chute, so that grain can be fed below the longitudinal overhanging section of the tween deck in way of the long cargo-holds, via the feeder hatch between consecutive tween deck hatches, and thus ensure that the lower holds will remain trimmed full during the voyage. This arrangement, for the carriage of grain on international deep sea voyages, has been examined and approved by the Department of Transport which is entrusted with the task of interpreting, for the Government of Canada, all the rules and regulations tabled at the International Conference on the Safety of Life at Sea 1960, with particular regard to the carriage of grain.

When dry bulk cargoes such as coal, phosphate rock, potash, bauxite and iron ore cargoes are loaded, the tween deck hatch-covers are hinged, folded and stowed towards one end of the tween deck hatch. By stowing them in this manner, the dead stowage in the tween deck is minimized. This is accomplished by providing a free hinge to one cover and portable hinges which are attached to the ends of the covers which are normally free to as to enable one cover which is provided with the free hinge to be rotated through 180° and to finally come to rest on the other cover which is left in a horizontal position, after which both covers are hinged upwards to stow verticaly within the overhanging section of the main deck. In this manner the hatch covers do not obstruct the loading of bulk cargoes such as coal, iron ore, bauxite, potash, phosphate rock, sugar, salt and machinery scrap.

Special arrangements are made at the hatch openings in the main deck whereby the deck winches can be used to position the hatch covers for the tween deck hatches. This takes the form of pulleys over which the ropes from the winches are run and be connected to the hatch covers.

The covers for the feeder hatches are hinged but, as they are relatively light, manual handling, with the assistance of a pair of rope blocks, presents no difficulties. Round bars are welded to the underside of the tween deck beams, spaced 12" apart in way of the feeder hatches. This avoids the necessity of providing guard rails around the hatches, but does not impede the free flow of bulk cargo to the lower hold.

The primary object of the present invention is to provide a vessel which will have all the advantages of an "open" ship, a closed shelter deck vessel and a single deck dry bulk carrying vessel.

A further object of the invention is to provide a vessel suitable for carrying grain and other such like cargo which will not require the erection of special wooden bulkheads around the perimeter of the hatches below the main deck.

A further object of the invention is to provide tween deck hatch covers which can be used as a chute, and feeder hatches through which bulk cargo is directed by the hatch covers into the lower hold.

A further object of the invention is to provide a vessel with a tween deck and tween deck hatch covers which will permit standard size cargo containers to be stowed on the tween deck.

These and other objects of the invention will be apparent from the following specification and the accompanying drawings, in which:

FIG. 8 is a partial longitudinal section of the vessel shown in FIG. 7 taken on the line 8—8 of FIG. 9.

FIG. 9 is a plan view of the tween deck taken on the line 9—9 of FIG. 7.

FIG. 10 is an enlarged longitudinal section of the main and tween decks and showing the method of handling the tween deck hatch covers.

Figure 1:
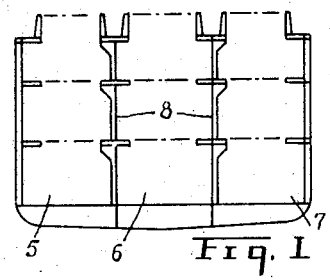
FIG. 1 is an outline transverse vertical section of an "open" type vessel.
Figure 2:
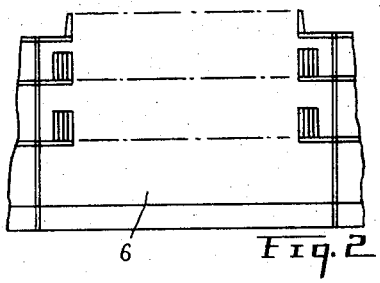
FIG. 2 is a partial longitudinal section of the vessel shown in FIG. 1.
Figure 3:
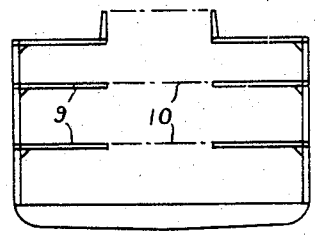
FIG. 3 is an outline transverse vertical section of a closed shelter deck type vessel.
Figure 4:
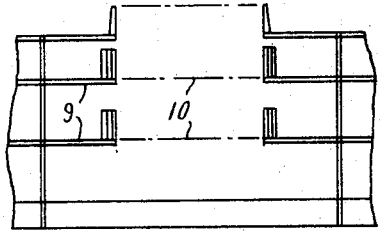
FIG. 4 is a partial longitudinal section of the vessel shown in FIG. 3.
Figure 5:
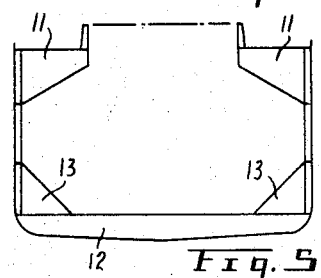
FIG. 5 is an outline transverse section of a single deck bulk carrier vessel.
Figure 6:
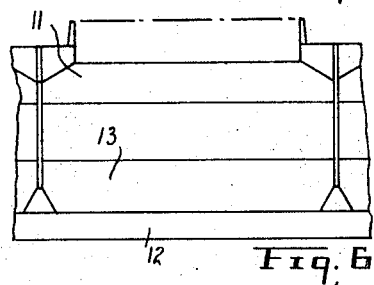
FIG. 6 is a partial longitudinal section of the vessel shown in FIG. 3.
Figure 7:
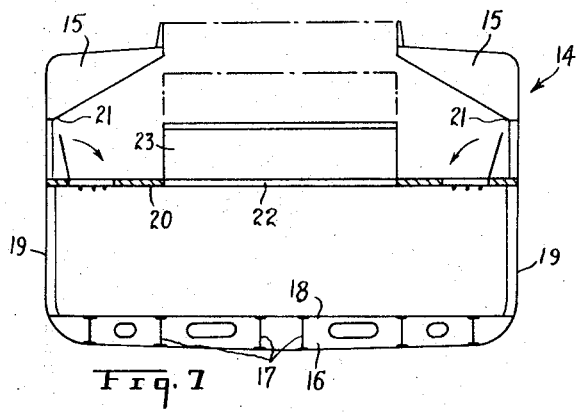
FIG. 7 is an enlarged outline transverse section of a vessel according to the present invention showing the tween deck hatch cover partially open.

Referring to the drawings, FIGS. 1 to 6 inclusive refer to prior art and illustrate in FIGS. 1 and 2 an "open" type vessel having three cargo holds 5, 6 and 7 oriented transversely across the vessel and separated from each other by longitudinal bulkheads 8, in the manner previously discussed. FIGS. 3 and 4 illustrate a "closed shelter deck" vessel having tween decks 9 and hatch openings 10 which average about one-third the breadth of the vessel. FIGS. 5 and 6 illustrate a "single-deck" bulk carrier vessel having upper wing ballast tanks 11 and an inner bottom ballast tank 12 which is hoppered at the sides at 13 designed to facilitate the unloading of bulk cargoes.

In the present invention as illustrated in FIGS. 7 to 13 inclusive, the vessel 14 is provided with upper wing ballast tanks 15, a double bottom ballast tank 16 which is stiffened at 17, in order to support heavy cargoes. It should be noted that the double bottom ballast tank 16 is not hoppered at the sides of the vessel in the manner shown in FIG. 5 but that the tank top 18 extends outwards to the side walls 19 of the vessel.

A self-supporting tween deck 20 is located at a distance of approximately eight feet six inches, above the top surface of the tween deck 20 and the lowermost point of the ballast tanks 15 measured at the side walls 19 of the vessel, in order to permit standard size cargo containers having a cross section of 8'0" x 8'0" to be stowed on the tween deck 20 close to the sides 19 of the vessel. The angle at which the base of the wing ballast tanks 15 is set in relation to a horizontal drawn through the point of intersection 21 of the base of the tanks with the sides 19 of the shell of the vessel is 30° and the width of the hatch opening 22 in the tween deck 20 is approximately 50% of the breadth of the vessel so that grain cargoes can be loaded without the need to erect grain shifting boards.

The hatch opening 22 in the tween deck 20 is closed by a pair of hatch covers 23 and 24. These hatch covers are supported on adjacent transverse peripheral edges of the opening 22 so as to be hingedly opened in the longitudinal direction of the vessel in the manner illustrated. If desired, the hinged covers 23 and 24 could be opened in a direction transversely of the vessel. The half cover 23 is supported on the adjacent edge of the tween deck 20 by a "fixed" hinge 25, i.e. a hinge which is not normally separated. The half cover 24 is supported on the adjacent edge of the tween deck 20 by a "free" hinge 26, i.e. a hinge which can be readily separated from its connection with the deck, while the two abutting edges of the half covers 23 and 24 are supported and joined together by a portable hinge 27, i.e. a hinge which permits the half cover 24 to be rotated relative to the half cover 23.

The hatch covers 23 and 24 are designed to be set into the hatch opening 22 in order to present a top surface flush with the top surface of the deck 20. Suitable loading stops 28 are provided for the hinged covers 23 and 24 when they are in the closed position.

In FIGS. 8 and 9 the two separate halves 27a and 27b of the portable hinge 27 have been separated from each other and the two half covers 23 and 24 are shown raised upwards about their hinges 25 and 26 to an angle of approximately 30°. When the half covers 23 and 24 are raised to this position and held by suitable chains, not shown, the covers can be used to divert a portion of bulk cargo being loaded as will be explained later.

In FIG. 10 there is shown a method of stowing the hatch covers 23 and 24 at one end of the hatch opening 22. In this arrangement, one of the cargo winches 29, mounted on a mast housing 30 above the main deck 31, is utilized to stow the hatch covers to one side of the hatch opening. The operation of stowing the hatch covers is as follows: The cables 32 and 33 from the winch 29 are led over the snatch blocks 34 and 35 which are mounted on the insides of the hatch coaming 36 at the main deck 31. The free ends of the cables 32 and 33 are connected to the edge of the hatch cover 24 adjacent to its free hinge 26. The free hinge 26 is then separated from its attachment to the tween deck 20; the hatch cover 24 is then raised by the winch 29 to a point where it is tipped over centre about the portable hinge 27 as shown in chain dot lines at 24a in FIG. 10. The cable 33 can now be disconnected from the hatch cover and the cover allowed to be lowered until it rests on the top surface of the cover 23 as shown at 24b in FIG. 10. The cable 37 from the winch 29 is led over the sheave 38, which is located in the recess 39 in the sides of the hatch coaming 36 and over the rollers 40 mounted on suitable brackets 41 under the hatch coaming 36. The free end of the cable 37 is connected to the hatch cover 23 adjacent the portable hinge 27. As the cable 37 is taken up on the winch 29, both covers 23 and 24 are lifted up about the fixed hinge 25 into a vertical position as shown at 42 in FIG. 10. The top ends of the vertically disposed covers 23 and 24 can now be secured to the brackets 41 on the under side of the main deck 31 or to any other suitable anchorage.

It will be noted in FIGS. 8 and 10 that the length of the opening at the hatch coaming 36 at the main deck 31 is less than the corresponding opening 22 in the tween deck 20 below. This difference in length permits the hatch covers 23 and 24, when raised into a vertical position as shown at 42 in FIG. 10, to be located under the main deck 31 leaving the hatch openings, as defined by the coaming 36, clear for loading and unloading of cargo.

The tween deck 20 is provided with large cargo feeder openings 43 located fore and aft of the hatch opening 22 close to the transverse bulkheads 44. A series of smaller cargo feeder openings 45, are also provided on the tween deck 20 and are spaced apart longitudinally of the vessel adjacent the sides 19 thereof.

All of the cargo feeder openings 43 and 45 are provided with a series of spaced apart round steel bars 46. The bars 46 are preferably welded to the underside of the deck 20 and their spacing is sufficient to permit free flow of the cargo, such as grain, through the opening into the lower hold 47 while providing ample safety support for personnel working on the tween deck 20. The use of guard rails around the openings 45 is, therefore, not required.

Each of the cargo feeder openings 43 and 45 are provided with a hinged steel door 48 which, when closed, is set flush with the top surface of the deck 20. The doors 48, when opened are hinged back against the adjacent transverse bulkheads 44 or the sides 19 of the vessel and are secured in the open position in any well known manner.

In FIGS. 7 to 10 inclusive only one hold of the vessel is illustrated. It is to be understood that all holds in the vessel will be similarly accessible and have flush tween deck surfaces.

The tween deck 20 at any one hold, between transverse bulkheads 44, is self-supporting, which means that the deck has sufficient built-in strength that no knee brackets are required which would otherwise interfere with the stowage of containers or other bulky cargo, such as bales of cotton, etc., close to the sides of the vessel or the transverse bulkheads.

In FIGS, 11, 12 and 13 the adaptability of the internal construction of the vessel to accept and stow all types of general cargo such as standard containers, baled and packaged goods, and ease of removal of such cargo is illustrated.

Figure 11:
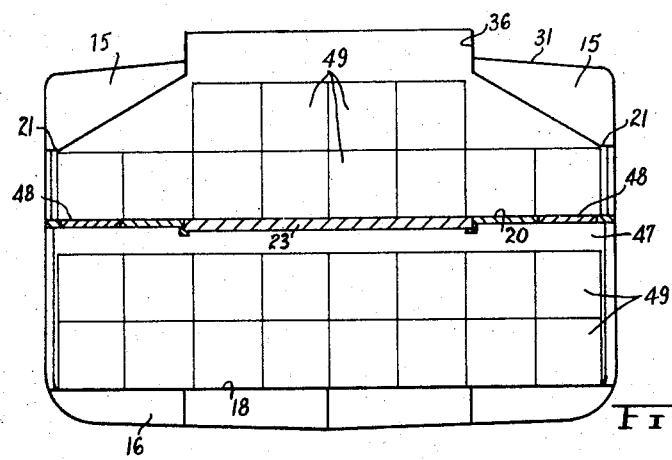
FIG. 11 is an enlarged transverse section similar to FIG. 7 but showing the vessel loaded with standard size cargo containers.
Figure 12:
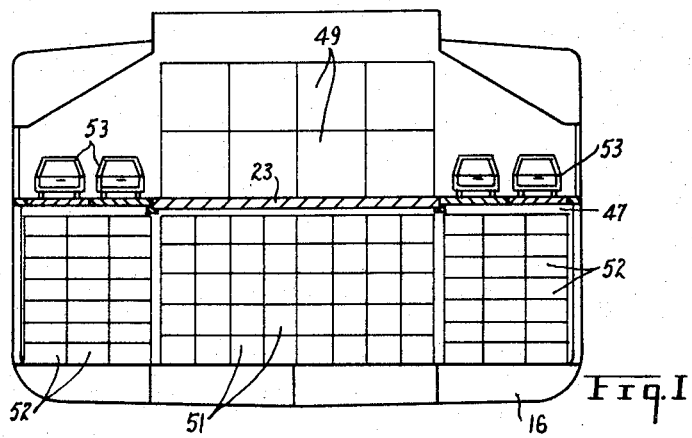
FIG. 12 is a view similar to FIG. 11 but showing the lower hold loaded with various sizes of containerized or baled cargo and standard size containers and automobile cargo loaded on the tween deck.

In FIG. 11 there is shown two tiers of standard 8′0″ x 8′0″ cargo containers 49 similar to those used in road and rail transportation, stowed in the lower hold 47 and on the tween deck 20. As the vertical height at the sides of the vessel between the tween deck 20 and the lowermost point 21 of the upper wing ballast tanks 15 is 8′6″, the containers 49 can be stowed close to the sides of the vessel. Similarly, with the tween deck 20 being self-supporting without the aid of knee brackets, and with the absence of hoppered sides at the top 18 of the double bottom the containers 49 can be stowed in the lower hold 47 close to the sides of the vessel and close under the tween deck 20.

In FIG. 12a variety of general cargo is shown stowed in the lower hold 47 and on top of the tween deck 20. In the lower hold small size containers 51 and baled or crated cargo 52, is stowed, while on the tween deck 20 two tiers of standard 8′0″ x 8′0″ cargo containers 49 are stowed on top of the hatch covers 23 and 24, while automobiles 53 are stowed in the space between the containers 49 and the sides of the vessel.

Figure 13:
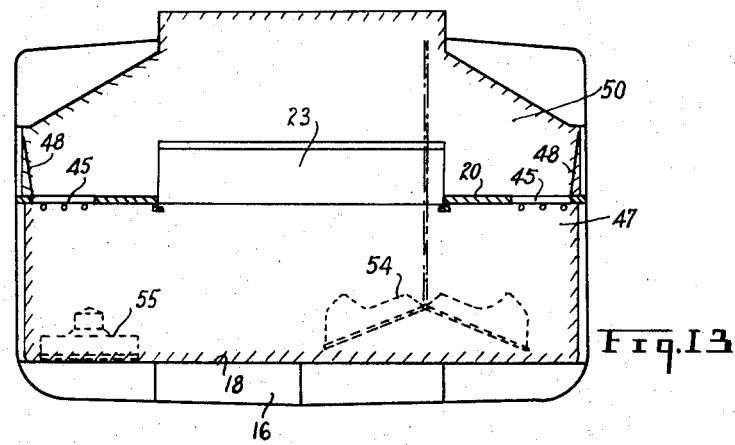
FIG. 13 is a view similar to FIG. 7 showing the ease with which large grabs and bulldozers can be used to empty and clean up the hold when the vessel has been loaded with dry bulk cargo such as ore or grain.

In FIG. 13 the vessel is shown used for the carriage of dry bulk cargo such as grain. For this use, during loading of the cargo, the hatch covers 23 and 24 are separated at their hinge 27 and are individually opened about their separate hinges 25 and 26 to a position about 30° from the horizontal as shown in FIG. 8. The covers are held in this position by means of suitable chains, not shown. The hinged covers 48 are also opened and secured. As the cargo, such as grain, is poured into the hold, a portion will flow down through the space between the partially opened hatch covers 23 and 24 down into the lower hold while a portion, striking the angled covers 23 and 24, will be diverted towards and through the cargo feeder openings 43 and thence into the lower hold, all as indicated by the arrows A in FIG. 8. The cargo can also be diverted by means of shoots or spouts towards the cargo feeder openings 45 at the sides of the vessel. By this means the lower hold 47 will be completely filled without manual trimming of the cargo. When the cargo builds up to the level of the tween deck 20 it will continue to build up until the whole area 50 above the tween deck is full. The cargo will build up until the whole area enclosed by hatching in FIGS. 8 and 13 is full. If desired, the hatch covers 23 and 24 and the covers 48 can be closed when the lower hold is full.

The reverse operation of unloading the dry bulk cargo involves withdrawing the cargo from the hold in the standard procedure by suitable means such as suction pipes or large grabs 54. Because of the relatively large area of the hatch openings at the main deck 31 and the tween deck 20, a bulldozer 55 can be lowered on to the tank top 18 and, as there are no obstructions at the tank top such as hoppered sides, as at 13 in FIG. 5, the bulldozer can rapidly clean out the whole area of the tank top. Any residual grain resting on the areas of the tween decks 20 between the hatch opening 23 and the feeder openings can be swept down into the lower hold and be cleaned up by the bulldozer.

It will be seen that the combination of a self-supporting tween deck and the particular form of cargo hatch covers and the means for either positioning them for diverting grain to side openings or stowing the covers to one side of the hatch opening, provides a vessel which will be suitable for carrying general or bulk cargo, all of which can be handled with a minimum of manual labour. The fact that the tween deck, when all openings are closed, presents a flush surface which ensures that any general cargo which has to be moved to or from the hatch opening, can be moved quickly and efficiently.

What we claim is:

1. A vessel for carrying general and bulk cargo, the said vessel having a main deck, a self-supporting tween deck and a series of transverse bulkheads defining cargo holds longitudinally of the vessel, each of the said cargo holds extending the full width of the vessel, upper side ballast tanks under said main deck, the lowermost portion of which, at the sides of the vessel, is located at approximately eight feet six inches above the top surface of the tween deck, a centrally located hatch opening in said main and tween deck at each hold of the vessel, the said hatch openings having a width equal to approximately 50% of the breadth of the vessel, a series of cargo feeder openings in the said tween deck located in spaced relation to the peripheral edges of the hatch opening, and hinged covers for said tween deck hatch opening and cargo feeder openings, the said hinged covers being positioned flush with the top surface of the said tween deck.

2. A vessel as set forth in claim 1 in which the hinged cover for the tween deck hatch opening is in two parts, each part when partly open form bulk cargo diverters, diverting a portion of the bulk cargo being loaded, to at least some of said cargo feeder openings.

3. A vessel as set forth in claim 1 in which the hinged cover for the tween deck hatch opening is in two parts, one part being hinged to a peripheral edge of the hatch opening by a fixed hinge, the other part being hinged to a peripheral edge of the hatch opening by a free hinge, and the two abutting edges of the hatch cover being connected together by a portable hinge.

4. A vessel as set forth in claim 1 in which the hinge cover for the tween deck hatch opening is in two parts, each part being hinged to an adjacent peripheral edge of the hatch opening and to each other, the said two part cover when one of its hinged connections to the deck is opened, is foldable about their connecting hinge and about their fixed hinge for stowage at one side of the hatch opening.

5. A vessel as set forth in claim 1 in which the said cargo feeder openings are provided with safety gratings which permits a free flow of bulk cargo through the openings.

6. A vessel as set forth in claim 1 in which the hinged covers for the tween deck hatch opening are stowable to one side of the deck hatch opening and winch means located above the main deck are operable to stow the hinged covers, the said winch means include cables, and guide sheaves located at the hatch opening in the main deck.

7. A vessel as set forth in claim 1 in which the hatch opening in the main deck is of less width than the hatch opening in the tween deck, and the hinged covers for the tween deck hatch opening are stowable in a vertical position to one side of the hatch opening beyond the vertical plane of the adjacent peripheral edge of the hatch opening in the main deck.

References Cited
UNITED STATES PATENTS

| | | | |
|---|---|---|---|
| 2,736,287 | 2/1956 | Kummerman | 114—72 |
| 3,019,757 | 2/1962 | Bailey | 114—72 |

MILTON BUCHLER, *Primary Examiner.*

T. M. BLIX, *Examiner.*